(12) United States Patent
Mintgen et al.

(10) Patent No.: US 6,600,285 B2
(45) Date of Patent: *Jul. 29, 2003

(54) ACTUATING SYSTEM COMPRISING A PISTON-CYLINDER ASSEMBLY TOGETHER WITH A DRIVING DEVICE

(75) Inventors: Rolf Mintgen, Thuer (DE); Ralf Rissel, Saffig (DE); Andreas Ritter, Hilgert (DE)

(73) Assignee: Stabilus GmbH, Koblenz (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/818,404

(22) Filed: Mar. 27, 2001

(65) Prior Publication Data

US 2001/0035725 A1 Nov. 1, 2001

(30) Foreign Application Priority Data

Mar. 27, 2000 (DE) .......................................... 100 14 820
Mar. 7, 2001 (DE) .......................................... 101 10 884

(51) Int. Cl.$^7$ ................................................. G05B 5/00
(52) U.S. Cl. .......................... 318/468; 318/286; 49/349; 49/352
(58) Field of Search ............................ 318/9, 280, 281, 318/282, 283, 286, 264, 266, 268, 466–470, 626; 49/139, 280, 349, 352, 26; 296/107.01, 117

(56) References Cited

U.S. PATENT DOCUMENTS

| 4,003,102 A | * | 1/1977 | Hawks et al. .................. 49/404 |
| 4,466,514 A | | 8/1984 | Mölders et al. |
| 4,585,981 A | | 4/1986 | Zintler |
| 4,595,182 A | | 6/1986 | Freitag et al. |
| 4,881,018 A | * | 11/1989 | Kato et al. ................... 318/280 |
| 5,278,480 A | * | 1/1994 | Murray ........................ 318/626 |
| 5,404,673 A | * | 4/1995 | Takeda et al. ............... 318/282 |
| 5,448,856 A | | 9/1995 | Moore et al. |
| 5,563,483 A | * | 10/1996 | Kowall et al. ............... 318/283 |
| 5,982,126 A | | 11/1999 | Hellinga et al. |
| 6,150,781 A | * | 11/2000 | Hollerbach .................. 318/283 |
| 6,293,050 B1 | * | 9/2001 | Johnk .......................... 49/276 |
| 6,305,737 B1 | * | 10/2001 | Corder et al. ................. 49/210 |
| 6,425,820 B1 | * | 7/2002 | Kennedy et al. .............. 49/118 |

FOREIGN PATENT DOCUMENTS

| DE | 40 36 900 | 5/1992 |
| JP | 7163170 | 6/1995 |

* cited by examiner

*Primary Examiner*—Khanh Dang
(74) *Attorney, Agent, or Firm*—Cohen, Pontani, Lieberman, Pavane

(57) ABSTRACT

An actuating system includes a driving device fixed to a base part and operatively connected to a movable part. A sensor detects the rotational speed of the movable part at a reference measuring location, and a control system forms a differential of the rotational speed with respect to the time. The formed differential is compared in a comparison unit with a stored differential value which corresponds to a measuring point on a route of movement of the movable part. An obstacle is recognized when there is a difference above a threshold value between the formed differential and the associated stored value.

45 Claims, 9 Drawing Sheets

ACTUATING SYSTEM COMPRISING A PISTON-CYLINDER ASSEMBLY TOGETHER WITH A DRIVING DEVICE

BACKGROUND OF THE INVENTION

1. Field of the Invention

The invention relates to an actuating system including a base, a movable part which is rotationally movable with respect to the base, and a driving device which is operatively connected to the movable part for rotationally moving it with respect to the base. A control system monitors the movement of the part and ascertains the presence of an obstacle if a parameter representing the movement differs from a stored parameter by more than a threshold limit.

2. Description of the Related Art

U.S. Pat. No. 5,982,126 discloses a control arrangement for a driven locking means, the control arrangement being provided for flaps or doors in a motor vehicle. The control arrangement includes, among other things, a piston-cylinder assembly which exerts an opening force on a rear flap or a vehicle door. Furthermore, a driving unit in the form of an electric motor provides, in conjunction with a cable device, a closing movement of the rear flap or the vehicle door.

The control arrangement includes obstacle recognition providing protection against jamming. For this, the power or the current of the electric motor is sensed and compared with data records which represent the movement of the vehicle door or of the rear flap. The movement is stored in accordance with parameters of the absolute closing force and, among other things, also in accordance with the dissipation of the closing force with regard to the time.

DE 40 36 900 A1 describes a driveable pivoting hinge for flaps or motor-vehicle doors. The pivoting hinge has an electric motor which acts directly on it or on a pivoting lever and brings about an opening and closing movement of the flap. An intermediate mechanism and an overload coupling may be used, if appropriate, for example in order to adapt a standard motor to the fitting situation.

SUMMARY OF THE INVENTION

The object of the present invention is to realize a piston-cylinder assembly in conjunction with a driving device having a simple operation and a low outlay on installation.

According to the invention, a sensor detects the rotational speed of a movable part at a reference measuring location, the control system forming a differential of the rotational speed with respect to time. The differential is compared in a comparison unit with a stored differential value which corresponds to a measuring point on a route of movement of the movable part. An obstacle is recognized when there is a difference above a threshold value between the formed differential and the associated stored value.

The advantage of measuring the rotational speed is that an obstacle is immediately detected at the movable part and not, as in the case of measuring the force at the driving unit, as an after effect.

In a further advantageous refinement, the sensor is designed as a rotary potentiometer. The part to be moved—the flap or door in a motor vehicle, executes a rotational movement which can be sensed with sufficient accuracy even by a relatively simple rotary potentiometer.

Each door or flap is subject, within limits, to individual influences which determine the speed of movement of the door or flap. For example, the friction of the hinges may differ. Also, springs which move a rear flap in the opening direction are subject to force tolerances. The ambient temperature can be regarded as a further important parameter in the use of a gas-filled spring device. In order to eliminate all these influences, the stored values which describe an obstacle-free movement of the part to be moved are established by a learning mode.

According to an advantageous embodiment, the movable part enters into operative connection with a lock and the obstacle recognition is limited to a region of movement lying outside a lock movement. The flap lock moves discontinuously and this can only be overcome using excessive effort. The probability of an obstacle being encountered in this short region of movement is negligible.

In one embodiment, a cable device is fastened to the part to be moved, the cable device being guided from a winding device via a deflecting pulley on a piston-cylinder assembly to a fastening point, and so the cable device forms a block and tackle system. A driving device can be used which only has to apply a small driving power.

In a further refinement, a cable of the cable device has a cable guide from the winding device to the deflecting pulley and a fastening point of the cable is arranged on the cable guide. The cable device can therefore be arranged directly on the piston-cylinder assembly without fastening means on the vehicle being necessary. The outlay on installation on the vehicle is at a similarly low level as in the case of a conventional piston-cylinder assembly.

So that the part to be moved is not blocked in the event of a power failure, the driving device has an electromagnetically connected coupling which is opened if the power fails.

For this purpose, a spring-type actuator is connected parallel with the driving device and drives the winding device if the driving device fails. This prevents, for example if the power fails during a closing movement of a flap, the cable of the cable device from lying in an uncontrolled manner in the vehicle and from possibly becoming entangled with the baggage in the trunk.

Furthermore, the cable of the cable device is guided to the piston-cylinder assembly within a sheath, the sheath enclosing the piston-cylinder assembly at least over the cable length which is on the piston-cylinder assembly. The intention is first to protect the cable device and secondly to protect people in the vicinity of the cable device when it is in operation.

For this purpose, the sheath comprises at least one telescopic protective tube.

In order to realize a protective tube having a small diameter and cable guidance which is as parallel as possible to the piston-cylinder assembly, the cable device comprises a first cable-guiding element on a connecting member of the piston rod and a second cable-guiding element on the cylinder of the piston-cylinder assembly.

In a further refinement, the cable-guiding element is designed as an annular bearing which is held by the connecting member. The annular bearings enable the cable-fastening point to move in the circumferential direction, so that no additional distortions or changes in length occur during the operating movement of the piston-cylinder assembly.

The driving unit preferably has a cable-tension sensing device whose signal is passed on to the coupling. During normal operation the cable tension must always lie within a certain operating range. If this operating range is departed from, further measures may be provided so as to enable the cable device to be operated in a manner approximating normal operation.

In order to keep the outlay on sensing as low as possible, the signal of the cable-tension sensing device is in the form of a 0–1 signal.

At a 0 signal from the cable-tension sensing device the coupling is opened. Suppose that an opened rear flap is to be closed. In addition to the driving device which closes the flap, the user presses on it. In the process, the cable tension falls away and the cable could again lie in an uncontrolled manner in the trunk. With the coupling opened, the spring-type actuator provides a driving force for the winding device thereby safeguarding the winding-up process.

In order to keep the structural outlay for the cable-tension sensing device low, the cable-tension sensing device comprises a switch which is actuated by the movement of the cable relative to a cable sheath.

Provision is furthermore made for the actuating system to have an elastic movement buffer which enables a phase displacement of the driving movement of the driving device to the actual movement of the movable part. The intention is to avoid the movable part striking hard against an obstacle. In addition, the driving device is subjected to less stress when an obstacle is encountered.

The sensor used to detect the movement of the part is arranged between the elastic movement buffer and the movable part. This enables the driving unit to operate without delay by means of the buffer.

In a first design variant, the elastic movement buffer is part of the piston-cylinder assembly and when there is a movement of a connecting-member part of the piston-cylinder assembly relative to a reference location of the piston-cylinder assembly the sensor generates a signal indicating an obstacle.

For this purpose, the movement buffer comprises a measuring body in conjunction with a measuring-reference device, the measuring body executing a movement relative to the measuring-reference device when the movable part strikes against an obstacle.

The measuring body and the measuring-reference device are designed as limit switches.

In an alternative embodiment of the actuating system having a base part and a part to be moved, the base part having a driving device which is operatively connected to the part to be moved, the driving device acts directly on a mechanism on the flap. The driving device acts, in one working direction, counter to the force of a piston-cylinder assembly and, in an opposite working direction, operating to maximum effect on a certain region of movement of the part to be moved.

Actuating systems which act directly on a flap or a door and in which the insertion of a cable device can be omitted have the advantage that the opening and the closing movement can be controlled by the driving device. For the driving device, however, the opening movement is associated with a considerably greater power output which would make the driving device more expensive and would enlarge it with regard to the structural space which is required. With the combination of a directly acting actuating system in conjunction with a piston-cylinder assembly the advantages of the drives of the driving device and of the piston-cylinder assembly can be used, in particular since the piston-cylinder assembly often only allows a slow flap movement due to unfavorable coupling points between the base part and the flap. If the driving device engages in an assisting manner in this opening angle region, then the piston-cylinder assembly can be of smaller dimensions with regard to the supporting force.

As a further measure for simplifying the actuating system the driving device and the control system are arranged in a common housing.

Particularly for the version having the directly connected driving unit, the latter has a mechanism, with an elastic transmitting element being arranged in the flow of force coming from the mechanism.

With regard to convenience a lock for the component to be moved can be operated via a remote control, the driving unit being activated by the same triggering signal.

In this case, a permanent signal is connected to touch-control triggering on the remote control for the driving device at the most until an end position of the part to be moved is reached, or an obstacle is encountered or another touch-control triggering takes place. A simple one-button remote control is sufficient.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
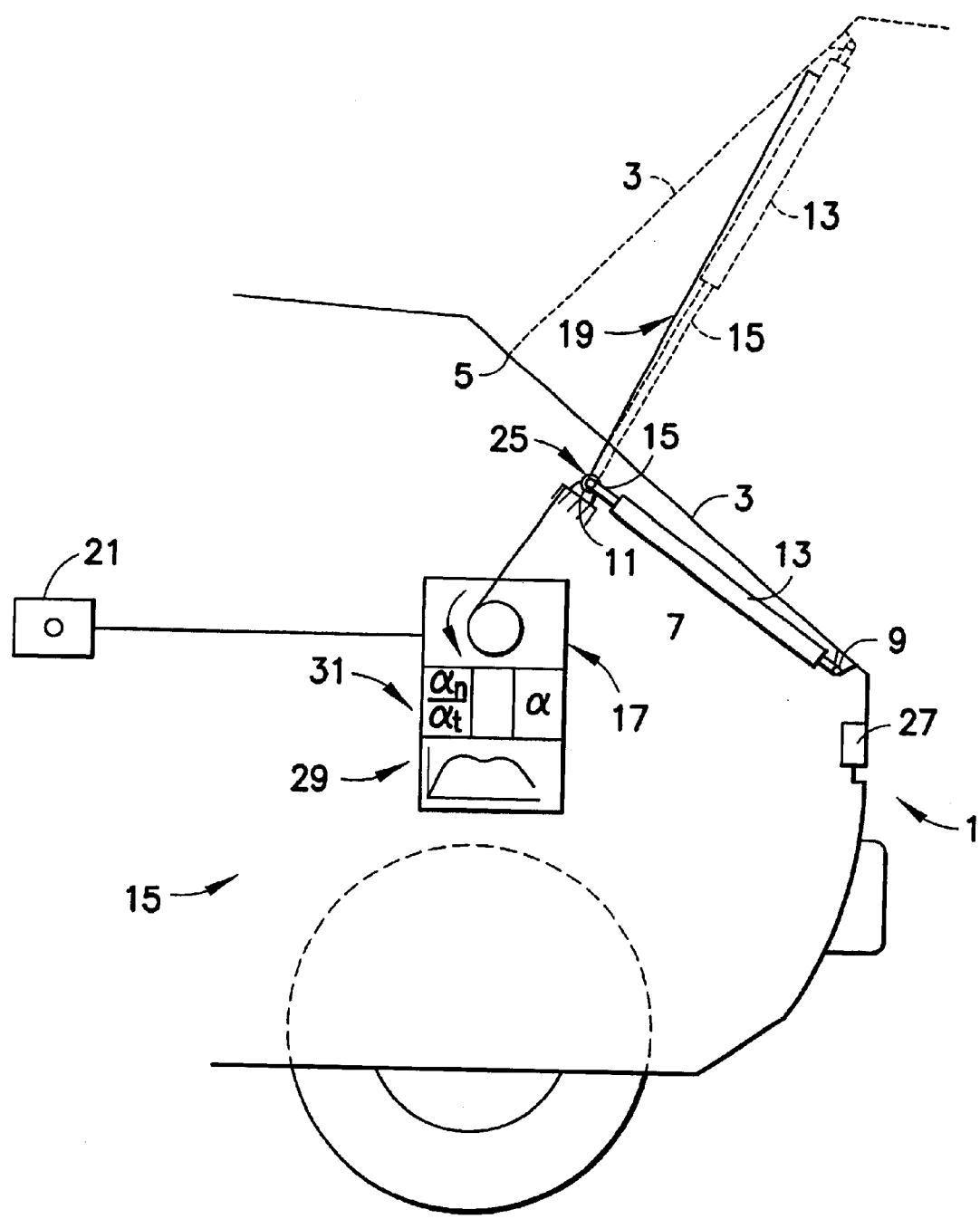
FIG. 1 shows a schematic diagram of the actuating system.

FIG. 1 shows a schematic diagram of a motor vehicle having a vehicle body as the base part 1 and a movable part 3 in the form of a rear flap, hereinafter a flap, although it may also be a hood, a vehicle door or corresponding cases of use.

The flap 3 is pivotably mounted at an axis 5 running transversely to the vehicle. At least one piston-cylinder assembly 7 exerts a force in the opening direction on the flap 3. The piston-cylinder assembly is preferably a gas-filled spring device optionally having end position damping. The piston-cylinder assembly 7 is fastened to the base part 1 and to the flap 3 via connecting members 9, 11. The main components of the piston-cylinder assembly are a cylinder 13 and a piston rod 15. For example, a piston-cylinder assembly according to U.S. Pat. Nos. 4,466,514 or 4,595,182 could be used.

The flap is closed by an actuating system 10 which comprises a driving device 17. This driving device is operatively connected to the flap 3 via a cable device 19. If the driving unit is initiated via a remote control 21, the driving unit 33 drives a winding device 23 (see FIG. 2) enabling the flap to be moved in the closing direction counter to the force of the piston-cylinder assembly. The remote control is equipped with touch-control triggering which actuates a continuous signal until an end position is reached, or another touch-control triggering takes place to stop the flap or an obstacle is encountered. The touch-control triggering therefore only requires one button.

A sensor 25, preferably a rotary potentiometer, senses the flap movement up to an angular region in which a flap lock 27 locks into place. The sensor 25 can be arranged on the axis 5, the connecting members 9, 11, or in the region of the driving device. When the flap is actuated for the first time, a control system 29 measures the angle of the flap position in conjunction with the instantaneous rotational speed of the part at measuring points on the route of movement of the flap, forms a differential of the rotational speed at each measuring point, and stores the differentials. The control system also forms the differential of the instantaneous speed with respect to time during subsequent movements and, by using a comparison unit 31, compares the formed differentials to the stored differentials and can recognize any discontinuity, i.e. excessive changes in acceleration. A change in acceleration above a threshold value can be the influence of an obstacle (not illustrated). If an obstacle is recognized, there is the option of the flap being reopened by a reversal of the direction of rotation of the driving device.

The closing angle of the flap is not sensed in the engagement region of the flap lock, since in this angular region there are relatively great discontinuities in the flap movement and these can only be filtered out with a disproportionate outlay.

Figure 2:
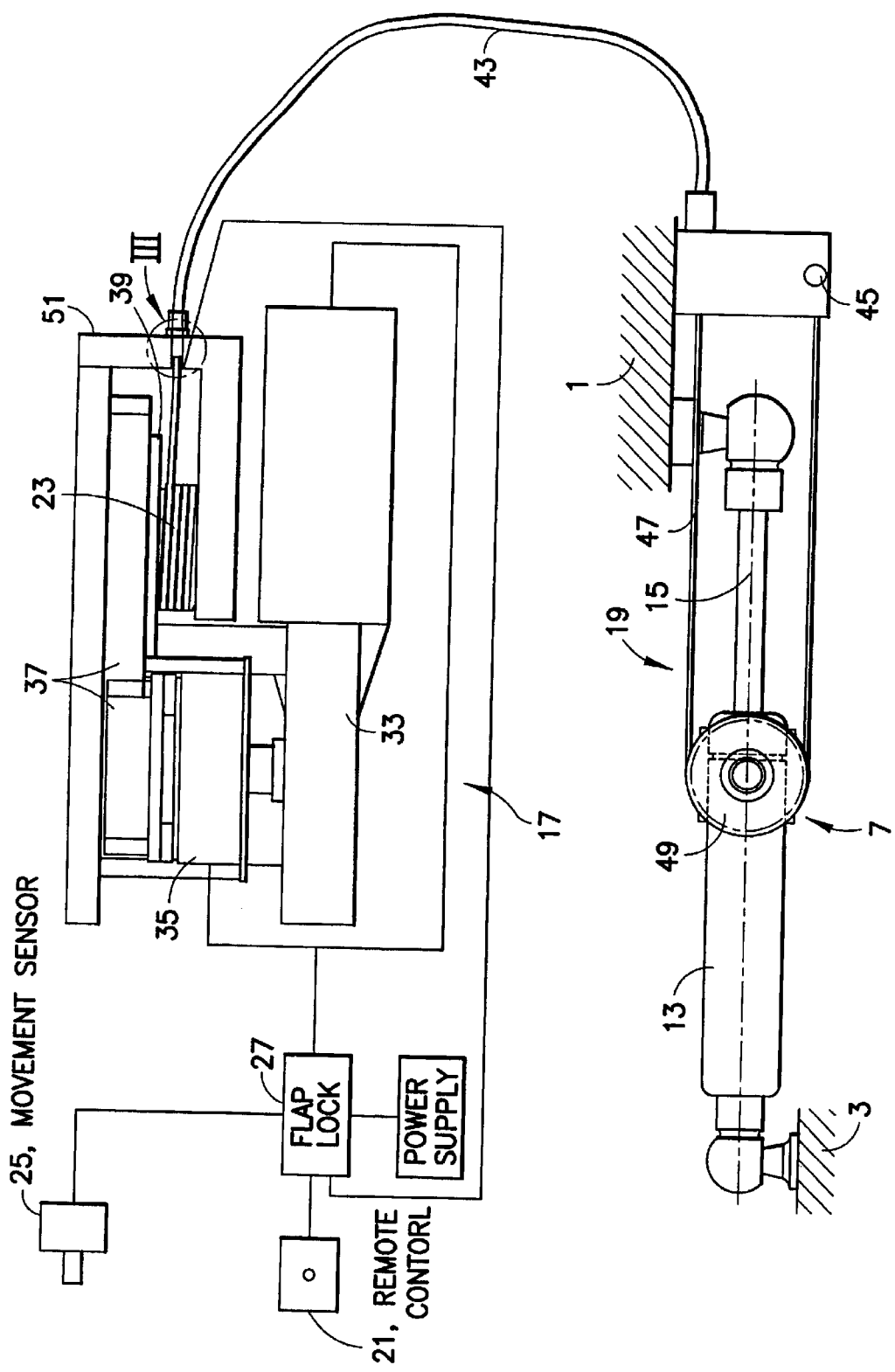
FIG. 2 shows the actuating system together with a cable device in the form of a block and tackle system.

FIG. 2 shows, in particular, the driving device 17 which has an electromagnetically connectable coupling 35 in addition to an electric motor 33. At least one gear stage 37 is connected downstream of the coupling and drives in turn the winding device 23 for the cable device 19. A spring-type actuator 39 is assigned to the winding device and drives the winding device in the winding-up direction when the coupling is opened. The spring-type actuator may, for example, be a spiral spring.

The cable device 19 on the piston-cylinder assembly 7 in FIG. 2 differs in design from FIG. 1. In the embodiment according to FIG. 2, a cable guide 41 is used which at one end supports a cable sheath 43 of the cable device 19 and provides a fastening point 45 for a cable 47 running within the cable sheath 43. Starting from the cable sheath, the cable 47 runs over a deflecting pulley 49, which is operatively connected to the cylinder 13, to the fastening point 45, with the result that the cable forms a block and tackle system.

As can also be seen from the pictorial illustration, the cable sheath runs in an arc between an input part 51 of the winding device 23 and the cable guide 41. If the cable is wound up, there is inevitably a tensioning movement in the cable sheath 43, as a result of which the cable sheath is supported by each of its ends against the input part 51 and against the cable guide 41. This effect is used for a cable-tension sensing device 53 which is arranged within the input part 51.

Figure 3:
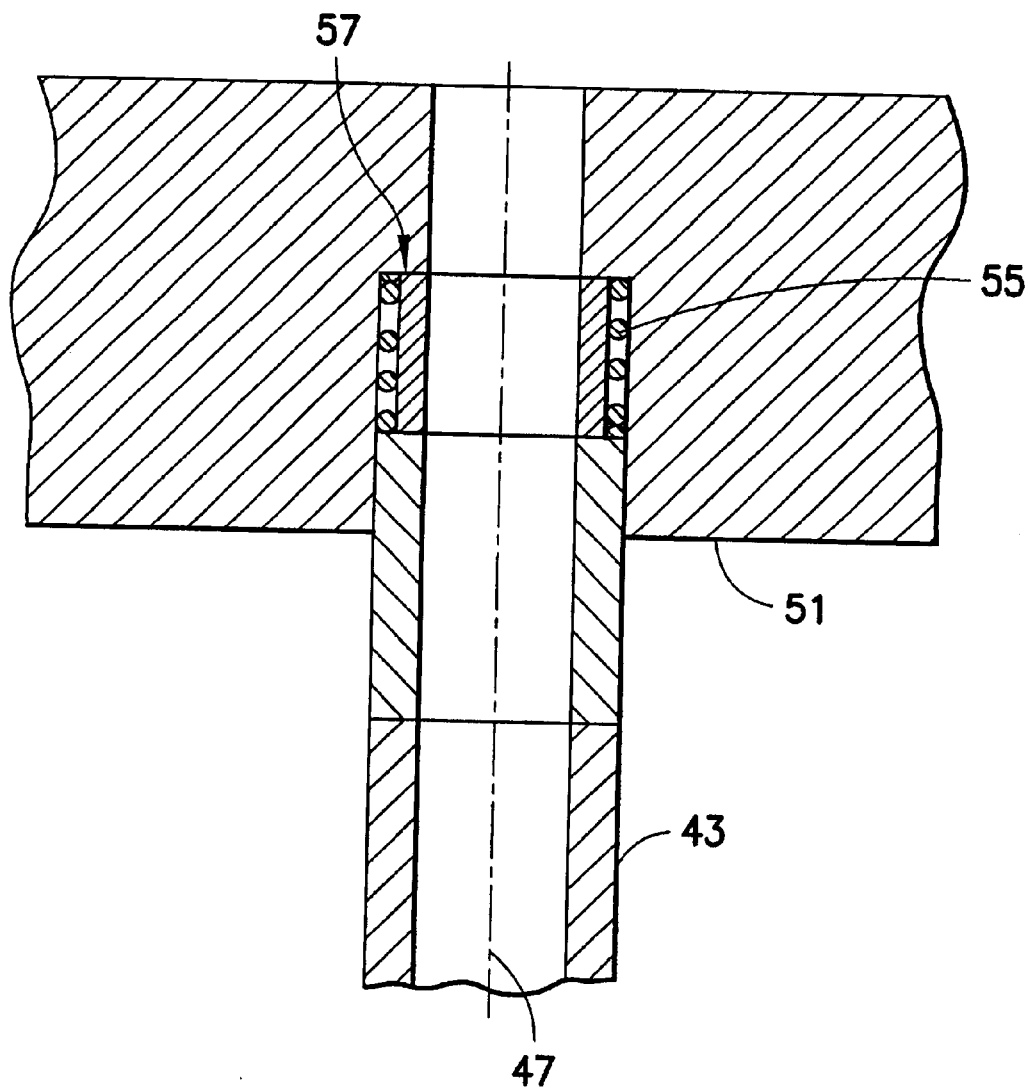
FIG. 3 shows the cable-tension sensing device as a detail.

FIG. 3 shows a schematic illustration of the cable-tension sensing device. The cable sheath 43 is pretensioned on the end side against the cable guide 41 (FIG. 2) by a spring 55. During a closing movement of the flap, which is carried out by the driving device 17, or a winding-up procedure of the cable 45, the cable sheath is pretensioned, in which case its two ends bear against the cable guide 41 and against the input part 51. The spring force of the spring 55 is overcome, so that a switch 57 does not obtain any contact. This switch emits a 0–1 signal to the control system 27 which, at a 0 signal and if the switch does not maintain any contact, opens the coupling 35 enabling the spring-type actuator 39 to drive the winding device.

Figure 4:
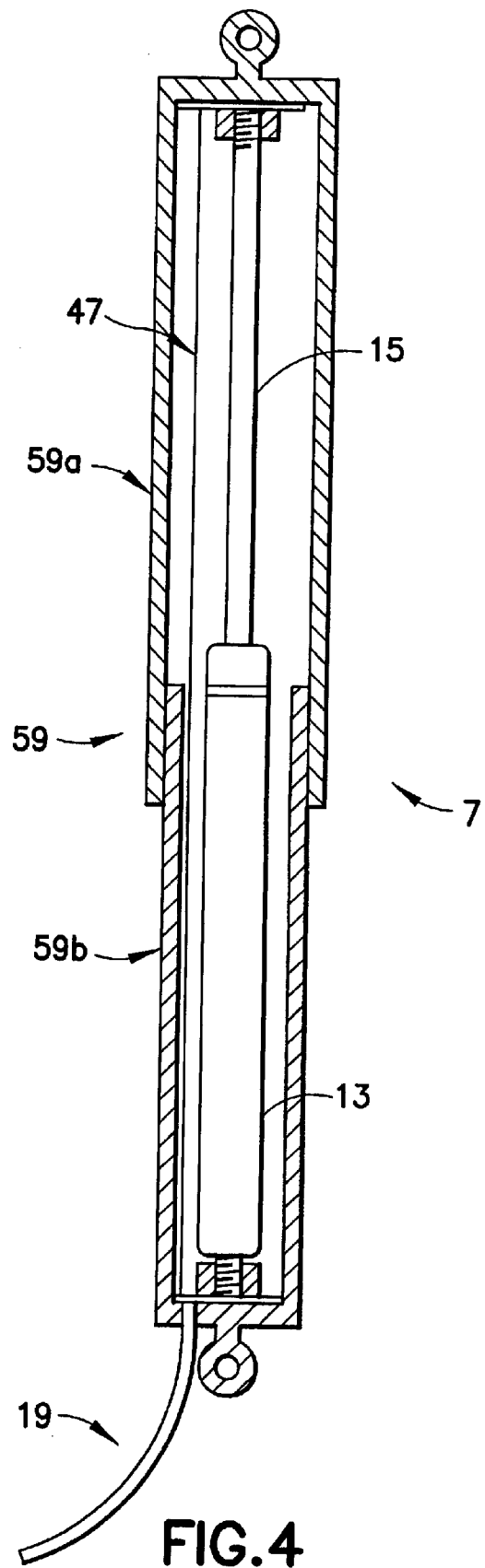
FIG. 4 shows a piston-cylinder assembly in a sheath, FIGS. 5(a,b) show the cable guide in a piston-cylinder assembly according to FIG. 1, FIGS. 6(a,b) show an exemplary embodiment of a movement buffer on the piston-cylinder assembly.

FIG. 4 shows a piston-cylinder assembly 7 according to FIG. 1 with the cable 47 together with the cylinder 13 and the piston rod 15 enclosed by a sheath 59. In general, mechanisms used with a flap are not especially protected, since their fitting ensures sufficient protection against external influences, such as moisture or dirt. The sheath 59, which comprises two mutually telescopic protective tubes 59a, 59b, is intended to protect the cable and the user so that no damage or injury occurs.

Figure 5A:
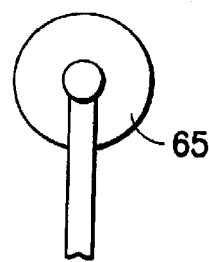
Figure 5B:
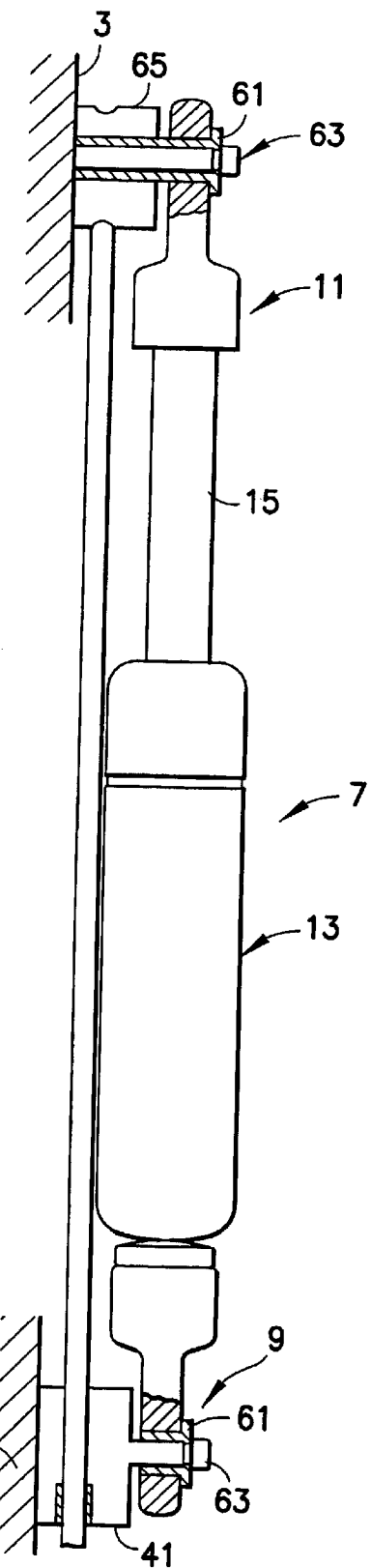

FIGS. 5a and 5b illustrate a detail with the piston-cylinder assembly 7 according to FIG. 1. The cable guide 41 is connected to the vehicle body 1 by the connecting member 9. The connecting member 9 itself can move on a fastening sleeve 61 and does not clamp to the cable guide 41 in the axial direction of the fastening sleeve. A fastening screw 63 secures the fastening sleeve 61 on the vehicle body. The through opening for the fastening sleeve 61 is designed with a square profile so that the cable guide 41 cannot be twisted by the supported force of the cable sheath 43. Of course, the profile may also be designed differently. An annular bearing 65 is inserted on the connecting member 11 and is able to rotate with slight play on the fastening sleeve 61 and therefore be oriented towards the cable guide.

Figure 6A:
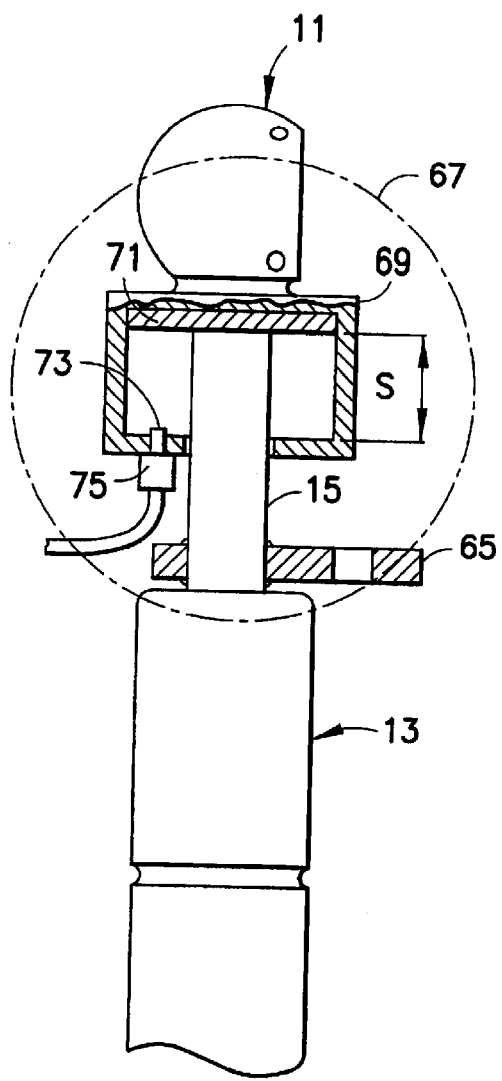
Figure 6B:
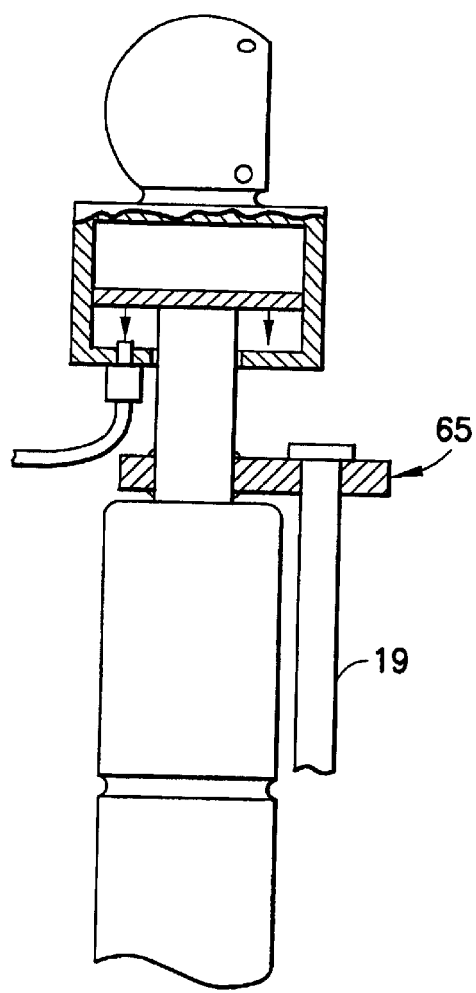

FIG. 6a shows a design variant of the connecting bearing 11 which has an elastic movement buffer 67. Within a sensor housing 69, which is connected fixedly to the connecting bearing, a measuring body 71 can be displaced as far as free play "s" in an axially displaceable manner with respect to the piston rod 15. A measuring-reference device 73, in conjunction with the measuring body 71, supplies a signal when there is a phase displacement between the connecting member 11 together with the sensor housing relative to the piston rod 15. The annular bearing 65 for the cable device 19 is fastened axially to the piston rod 15.

If the cable device 19 is used to pull on the piston rod 15 via the annular bearing 65, there has to be continuous contact between the measuring body and the upper floor of the sensor housing for an undisturbed movement of the flap 3, which is fastened to the connecting member. The free play "s" remains constant.

If an obstacle is encountered, the piston rod 15 together with the measuring body 71, which is fastened to the piston rod, is pulled further in the direction of the cylinder 13 by the cable device 19. In contrast, the flap and the connecting member 11 are stopped together with the measuring body 71 by the obstacle. The measuring body and the measuring-reference device 73 execute a relative movement in which the measuring body at most travels over the free play "s". If the measuring body 71 and the measuring-reference device 73 are, for example, a capacitive sensor, an obstacle can be recognized without further steps being taken.

A simple limit switch 75 can also be used which only supplies a simple 0–1 signal constituting a closing or opening signal to the coupling 35. If an obstacle is ascertained via the elastic movement buffer 67, then the coupling can immediately be opened without computational procedures, as described for FIG. 1. The extension force of the piston-cylinder assembly 7 causes the flap to be immediately opened by the measuring body 71 bearing against the sensor housing 69 below the connecting member 11 and transmitting a compressive force.

Figure 7:
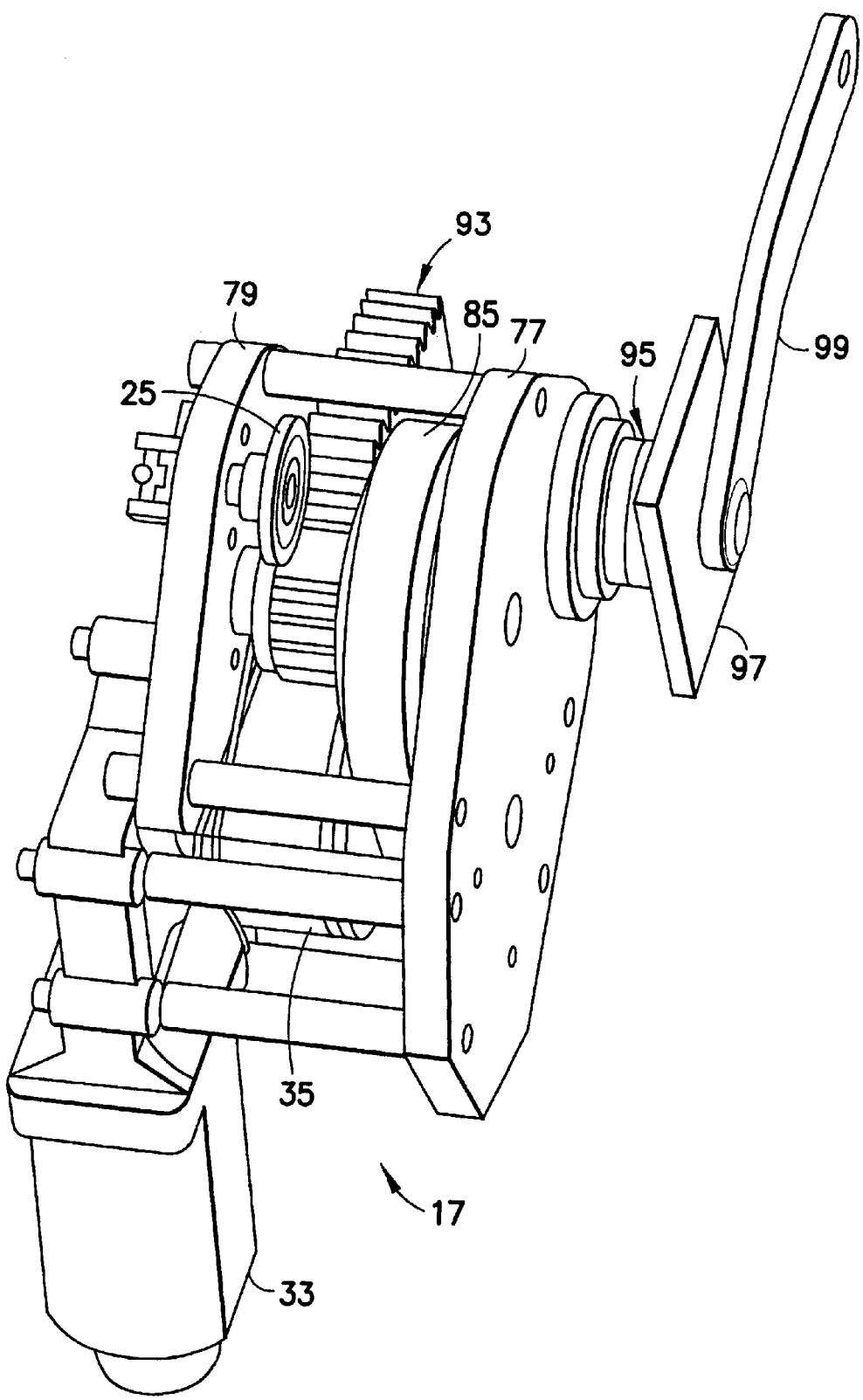
FIGS. 7–9 show the driving device connected directly to the flap.
Figure 8:
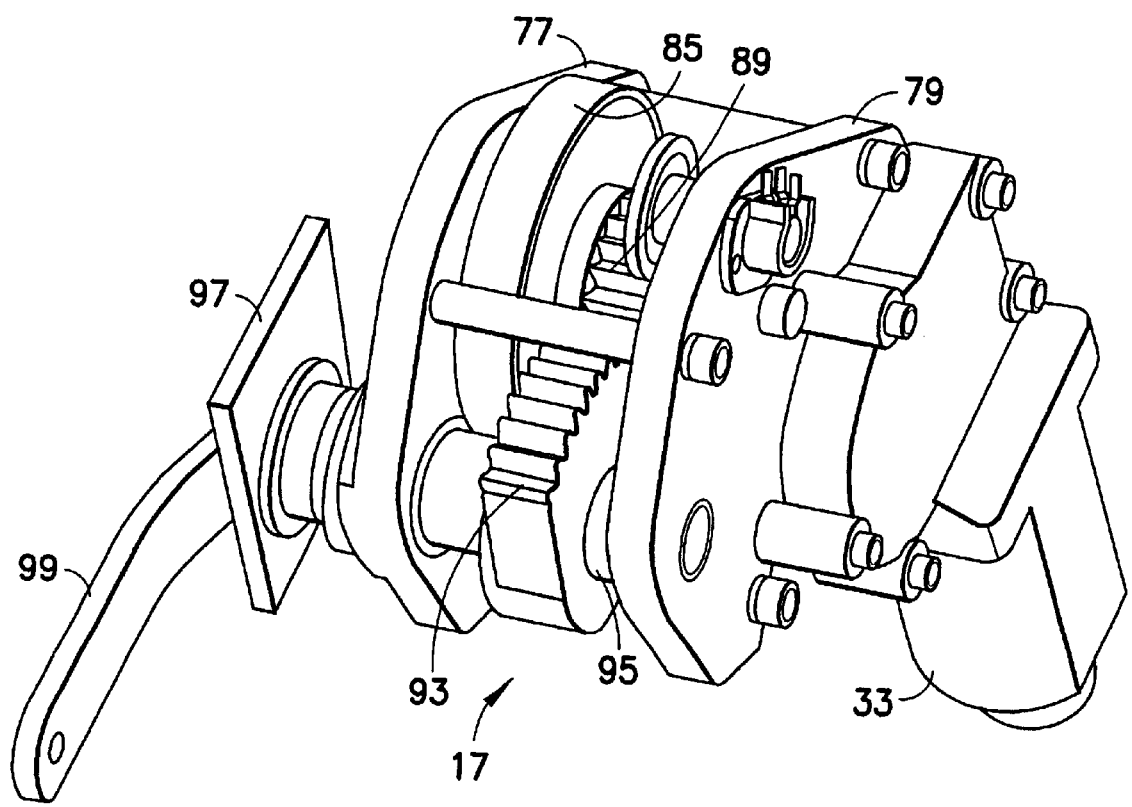
Figure 9:
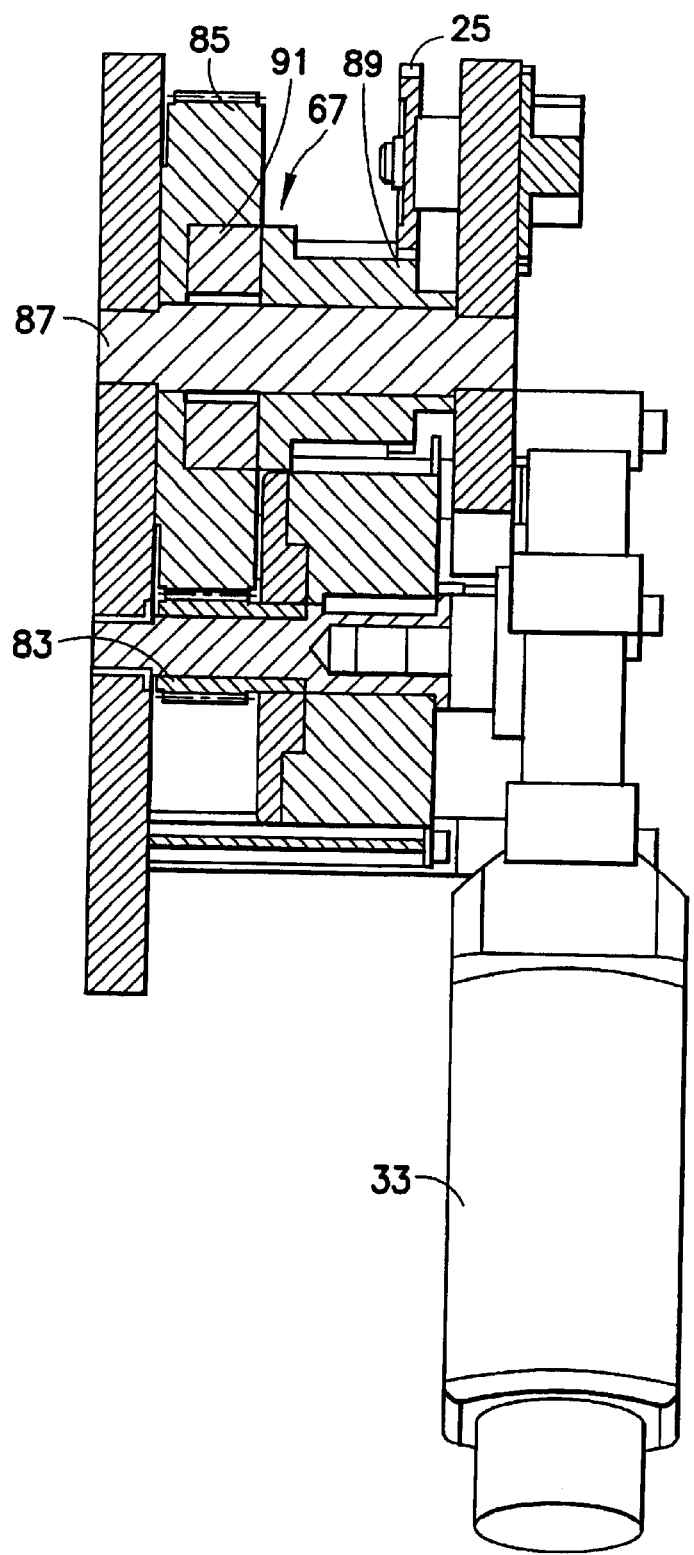

FIGS. 7, 8 and 9 illustrate an actuating system which is connected directly to the flap 3. The driving device 17 comprises two parallel holding plates 77, 79, the electric motor 33 being fastened to the holding plate 79. A drive shaft 81 is connected to the coupling 35 and its power take-off side bears a first gear wheel 83. The first gear wheel 83 is in engagement with a second, larger gear wheel 85 on an intermediate shaft 87. The intermediate shaft 87 has a third gear wheel 89 which does not, however, have a torque connection to the intermediate shaft. The third gear wheel 89 engages axially in the second gear wheel 85 in accordance with the principle of a claw-type coupling. For this purpose, the third gear wheel 89 has segments (not illustrated) which run axially. The elastic movement buffer 67 is formed between the second gear wheel 85 and the third gear wheel 87 by an elastic transmitting element 91 which enables a limited relative movement between the second gas wheel 85 and the third gear wheel 89.

The third gear wheel 89 is, in turn, smaller than a gear wheel segment 93 which is in engagement with it and is connected fixedly to a power take-off shaft 95. A gear wheel segment can be used for the power take-off shaft, since the power take-off shaft only executes a movement corresponding to the opening angle of the flap. The power take-off shaft 95 in turn is mounted in a fastening plate 97 which, in turn, is connected to the vehicle body and acts as a torque support for the driving device 17. Arranged at the end of the drive shaft is an actuating lever 99 which acts on the flap 3 directly or with the insertion of a lever linkage.

The driving device can close and also open the flap, a piston-cylinder assembly (not illustrated) being connected parallel to it for the opening movement. In order to insert as little energy as possible into the actuating system, it is expedient to limit the opening movement of the driving piston 17 to only part of the opening angle of the flap until the piston-cylinder assembly has, because of the coupling points of the connecting members, a lever arm with respect to the flap which is of a size sufficient to enable the piston-cylinder assembly to execute the opening movement from its own force.

FIG. 9 discloses a location for installing the sensor 25 in the region of the driving device 17. The third gear wheel 89 on the intermediate shaft 87 drives the sensor 25. This measure enables the measuring range of the sensor to be expanded, thereby enabling more sensitive measurement of the rotational movement with regard to recognizing an obstacle.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuating system for moving a movable part which is rotationally movable with respect to a base, said actuating system comprising a driving device which is operatively connected to said movable part for rotationally moving said movable part with respect to said base, said driving device comprising an electromagnetic coupling which opens if a power failure occurs, and a spring type actuator which is connected in parallel to the driving device to drive the driving device when the coupling opens.

2. An actuation system according to claim 1 further comprising a piston-cylinder assembly fixed between said base and said movable part, said driving device comprising a winding device fixed to said base, and a cable device including a cable having one end which is fixed to said winding device for winding said cable thereon, and an opposite end fixed with respect to said base.

3. An actuation system according to claim 2 wherein said driving device further comprises a deflecting pulley on said piston cylinder assembly, said cable passing over said pulley between said ends to form a block and tackle system.

4. An actuation system according to claim 3 further comprising a cable guide fixed on said base, said cable between said ends passing through said cable guide, said opposite end being fixed to said cable guide.

5. An actuation system according to claim 2 wherein said piston cylinder assembly comprises a piston rod and a cylinder, said cable device further comprising a first cable guide fixed with respect to said piston rod, and a second cable guide fixed with respect to said cylinder, said cable passing through said first and second cable guides.

6. An actuation system according to claim 5 wherein the first cable guide is an annular bearing.

7. An actuation system according to claim 2 further comprising a cable tension sensing device which transmits a signal to the coupling.

8. An actuation system according to claim 7 wherein said signal is one of a zero signal and a one signal.

9. An actuation system according to claim 8 wherein the zero signal opens the coupling.

10. An actuation system according to claim 7 further comprising a cable sheath which receives said cable therethrough, said cable tension sensing device comprising a switch which is actuated by movement of the cable relative to the cable sheath.

11. An actuation system according to claim 1 further comprising an elastic movement buffer which enables a phase displacement of the movement of the driving device with respect to the movement of the movable part.

12. An actuation system according to claim 11 further comprising a connecting member fixed to said base, said elastic movement buffer comprising a measuring device fixed with respect to said connecting member part, said measuring device generating a signal indicating an obstacle when said connecting member moves relative to a reference location on the piston cylinder assembly.

13. An actuation system according to claim 12 wherein said piston cylinder assembly comprises a piston and a cylinder, said elastic movement buffer further comprises a measuring body fixed to said piston, said measuring body moving relative to said measuring device when said movable part strikes an obstacle.

14. An actuation system according to claim 13 wherein said measuring body and said measuring device act as a limit switch.

15. An actuating system as in claim 1 wherein said driving device comprises an electric motor and a drive mechanism for transmitting force from said motor to said movable part, said drive mechanism comprising an elastic transmission element.

16. An actuating mechanism as in claim 1 further comprising a lock for locking said movable part to said base, and a remote control unit for activating said lock and for activating said driving device.

17. An actuating unit as in claim 16 wherein said remote control unit comprises touch control triggering which actuates a continuous signal until another touch control triggering takes place, an end position of the movable part is reached, or an obstacle is encountered.

18. An actuating system for moving a movable part which is rotationally movable with respect to a base, said actuating system comprising
   a piston cylinder assembly fixed between said base and said movable part,
   a driving device which is operatively connected to said movable part for rotationally moving said movable part with respect to said base, said driving device comprising a winding device fixed to said base, and a cable device including a cable having one end which is fixed to said winding device and an opposite end fixed with respect to said movable part, said winding device winding up said cable in order to rotate said movable part with respect to said base, and
   a sheath enclosing said piston cylinder assembly and an enclosed portion of said cable parallel to said piston-cylinder assembly.

19. An actuation system according to claim 18 wherein said sheath comprises a telescoping protective tube.

20. An actuation system according to claim 18 further comprising an elastic movement buffer which enables a phase displacement of the movement of the driving device with respect to the movement of the movable part.

21. An actuating system as in claim 18 wherein said driving device comprises an electric motor and a drive mechanism for transmitting force from said motor to said movable part, said drive mechanism comprising an elastic transmission element.

22. An actuating mechanism as in claim 18 further comprising a lock for locking said movable part to said base, and a remote control unit for activating said lock and for activating said driving device.

23. An actuating unit as in claim 22 wherein said remote control unit comprises touch control triggering which actuates a continuous signal until another touch control triggering takes place, an end position of the movable part is reached, or an obstacle is encountered.

24. An actuating system for moving a movable part which is rotationally movable with respect to a base, said actuating system comprising
   a driving device which is operatively connected to said movable part for rotationally moving said movable part with respect to said base, said driving device comprising a winding device fixed to said base, a cable device comprising a cable having one end which is fixed to said winding device, an opposite and fixed with respect to said base, and a sheath which receives said cable therethrough,
   an electromagnetic coupling which opens if a power failure occurs, and
   a cable tension sensing device which transmits a signal to the coupling, said sensing device comprising a switch which is actuated by movement of the cable relative to the cable sheath.

25. An actuating system for moving a movable part which is rotationally movable with respect to a base, said actuating system comprising
   a driving device which is operatively connected to said movable part for rotationally moving said movable part with respect to said base, and
   an elastic movement buffer which enables a phase displacement of the movement of the driving device with respect to the movement of the movable part.

26. An actuation system according to claim 25 further comprising a piston-cylinder assembly fixed between said base and said movable part, said driving device comprising
   a winding device fixed to said base, and
   a cable device including a cable having one end which is fixed to said winding device for winding said cable thereon, and an opposite end fixed with respect to said base.

27. An actuation system according to claim 26 wherein said driving device further comprises
   a deflecting pulley on said piston cylinder assembly, said cable passing over said pulley between said ends to form a block and tackle system.

28. An actuation system according to claim 27 further comprising a cable guide fixed on said base, said cable between said ends passing through said cable guide, said opposite end being fixed to said cable guide.

29. An actuation system according to claim 26 wherein said driving device comprises an electromagnetic coupling which opens if a power failure occurs.

30. An actuation system according to claim 29 further comprising a spring-type actuator which is connected in parallel to the driving device to drive the driving device when the coupling opens.

31. An actuation system according to claim 26 wherein said piston cylinder assembly comprises a piston rod and a cylinder, said cable device further comprising a first cable guide fixed with respect to said piston rod, and a second cable guide fixed with respect to said cylinder, said cable passing through said first and second cable guides.

32. An actuation system according to claim 31 wherein the first cable guide is an annular bearing.

33. An actuation system according to claim 29 further comprising a cable tension sensing device which transmits a signal to the coupling.

34. An actuation system according to claim 33 wherein said signal is one of a zero signal and a one signal.

35. An actuation system according to claim 34 wherein the zero signal opens the coupling.

36. An actuation system according to claim 33 further comprising a cable sheath which receives said cable therethrough, said cable tension sensing device comprising a switch which is actuated by movement of the cable relative to the cable sheath.

37. An actuation system according to claim 25 further comprising a connecting member fixed to said base, said elastic movement buffer comprising a measuring device fixed with respect to said connecting member part, said measuring device generating a signal indicating an obstacle when said connecting member moves relative to a reference location on the piston cylinder assembly.

38. An actuation system according to claim 37 wherein said piston cylinder assembly comprises a piston and a cylinder, said elastic movement buffer further comprises a measuring body fixed to said piston, said measuring body moving relative to said measuring device when said movable part strikes an obstacle.

39. An actuation system according to claim 38 wherein said measuring body and said measuring device act as a limit switch.

40. An actuating system as in claim 25 wherein said driving device comprises an electric motor and a drive mechanism for transmitting force from said motor to said movable part, said drive mechanism comprising an elastic transmission element.

41. An actuating system as in claim 25 further comprising a lock for locking said movable part to said base, and a remote control unit for activating said lock and for activating said driving device.

42. An actuating unit as in claim 41 wherein said remote control unit comprises touch control triggering which actuates a continuous signal until another touch control triggering takes place, an end position of the movable part is reached, or an obstacle is encountered.

43. An actuating system for moving a movable part which is rotationally movable with respect to a base, said actuating system comprising a piston cylinder assembly fixed between said base and said movable part, and a driving device which is operatively connected to said movable part for rotationally moving said movable part with respect to said base, said driving device comprising a winding device fixed to said base, and a cable device including a cable having one end which is fixed to said winding device and an opposite end fixed with respect to said base, said winding device winding up said cable in order to rotate said movable part with respect to said base.

44. An actuating system according to claim 43 wherein said driving device further comprises a deflecting pulley on said piston cylinder assembly, said cable passing over said pulley between said ends to form a block and tackle system.

45. An actuating system according to claim 44 further comprising a cable guide fixed on said base, said cable between said ends passing through said cable guide, said opposite end being fixed to said cable guide.

* * * * *